Feb. 1, 1938.　　　　B. M. SHORT　　　　2,107,015
TIRE COVER AND LOCK THEREFOR
Filed Aug. 26, 1935　　　　5 Sheets-Sheet 1
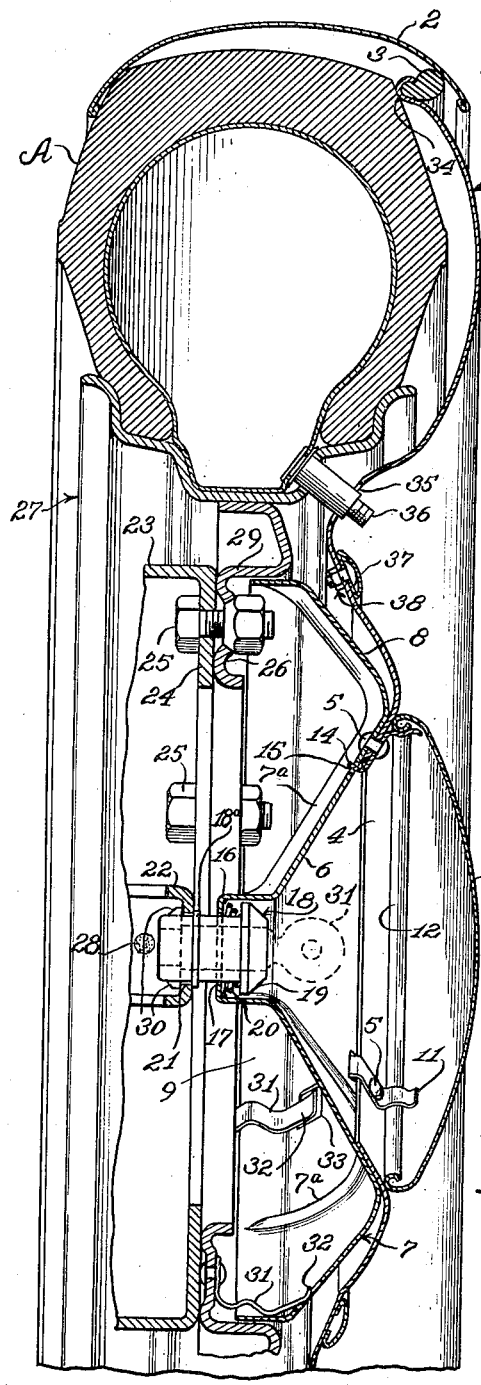
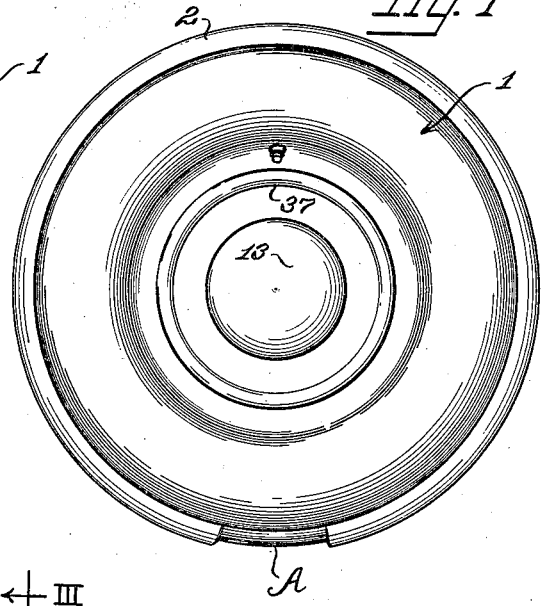
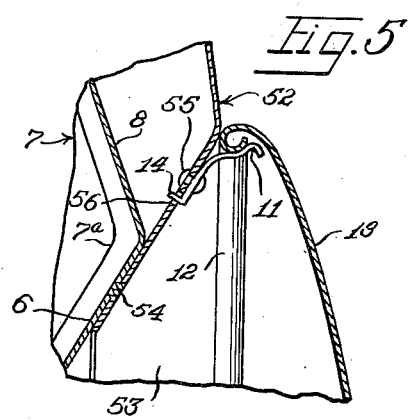
Inventor
Bladen M. Short

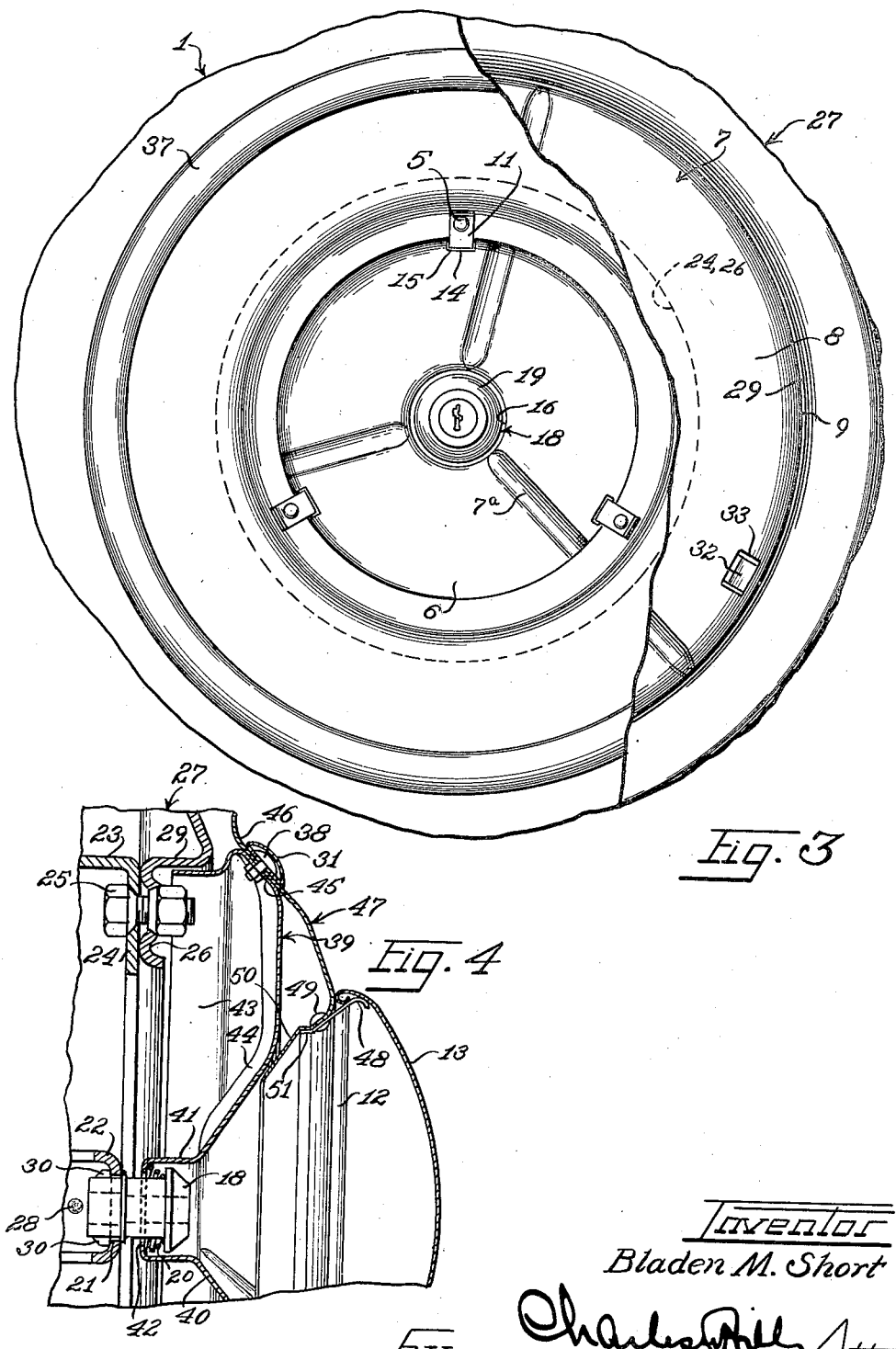

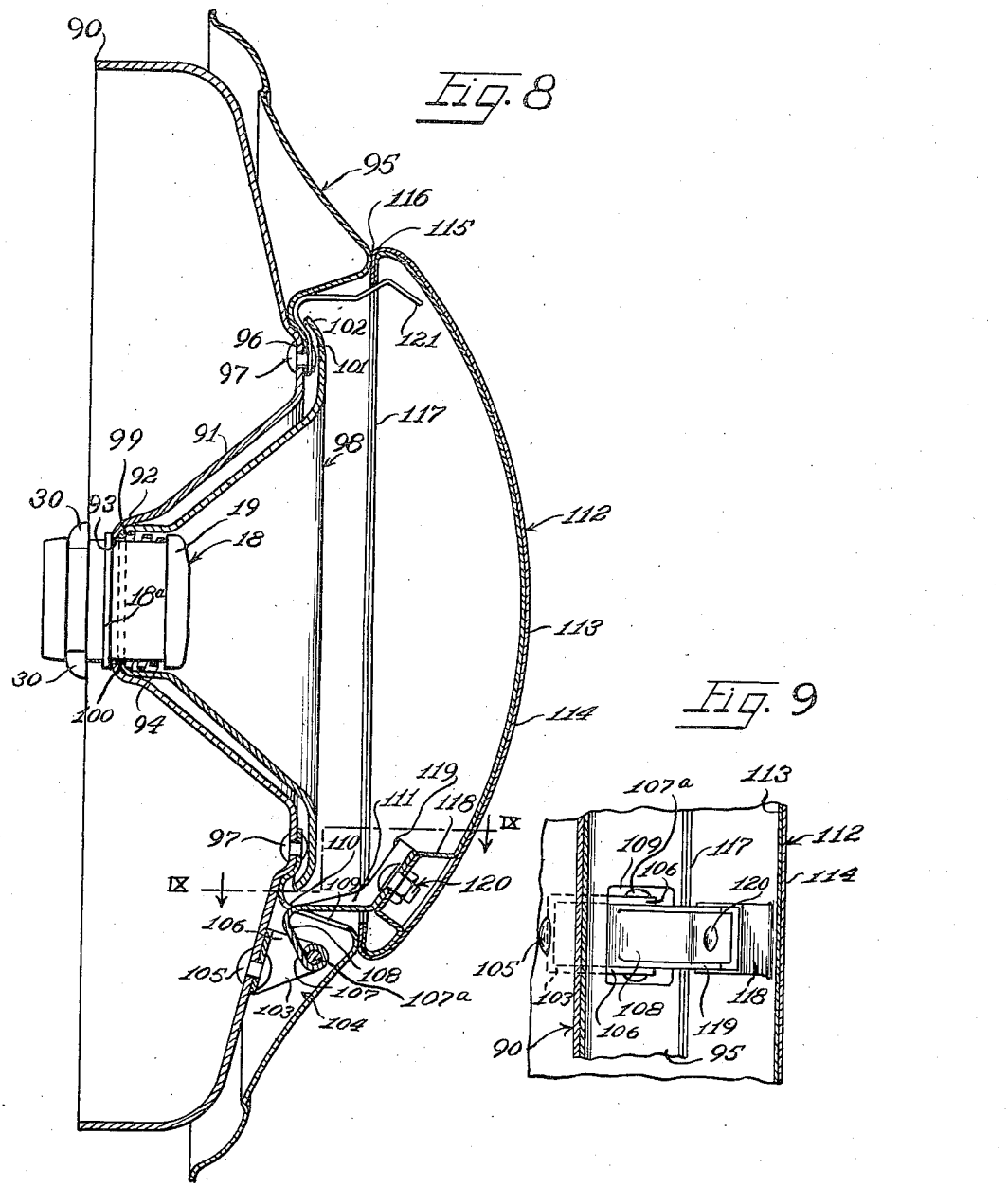

Patented Feb. 1, 1938

2,107,015

UNITED STATES PATENT OFFICE 2,107,015

TIRE COVER AND LOCK THEREFOR

Bladen M. Short, Detroit, Mich., assignor, by mesne assignments, to Houdaille-Hershey Corporation, Detroit, Mich., a corporation of Michigan Application August 26, 1935, Serial No. 37,874

14 Claims. (Cl. 150—54)

This invention relates to tire covers, and is concerned more particularly with an improved cover and cover lock construction.

It is an object of the invention to provide a tire cover adapted to cover a side of the wheel, and to be supported and locked in position by a unitary supporting and locking device of the snap-on or other type.

It is another object of the invention to afford cover means in the form of a shell or hood comprising a steel or other suitable preferably metal drum stamping or plate providing a locking means and effectively covering all of the attaching means by which the wheel is connected to the wheel carrier.

It is a further object of the invention to provide a hood of this type including centrally located locking means for locking the hood in place.

It is a further object of the invention to provide such a locking plate device with a cover for the tire.

It is a still further object of the invention to provide such a stamping with means whereby a cap simulating a hub cap may be detachably secured in a position to shield the locking means.

It is also an object of the invention to provide the wheel carrier with means for cooperating with the locking means associated with such a stamping, so as to lock both the wheel and the stamping in place.

Another object of the invention involves the provision of such a stamping with means in cooperation with the wheel for guiding the stamping into proper cooperative relation to the wheel.

It is also an object of the invention to provide means for preventing rattling of the stamping relative to the wheel.

It is an additional object of the invention to provide a wheel carrier with means to which the wheel may be hooked readily with a substantially single movement of the wheel, the wheel thereupon serving to locate the locking means of the stamping or the like in a position to cooperate with the carrier in locking the stamping as well as the wheel in place.

It is also an object of the invention to provide means affording an adjustable or floating relation between the locking unit and the stamping for compensating for various widths of tires of the same nominal size.

It is another object of the invention to provide a cover member with locking means including a screw member and so arranged as to prevent rotation of the screw member relative to the cover member and to prevent rotation of the cover member relative to the cover supporting means.

In accordance with the general features of the invention, there is provided a substantially drum-shaped member such as a stamping formed to be telescopically assembled with the wheel and formed with a substantially central depression for receiving the head of a securing or locking bolt. A carrier arranged at the rear of the wheel and to which the wheel may be bolted or otherwise detachably secured is provided with a bracket arranged to receive the securing or locking bolt aforesaid extending from the stamping. The bolt may be of the character which incorporates theft proof means, such as means which may be operated by a key, and the stamping is arranged to prevent unauthorized access to the means for supporting the wheel on the carrier. Accordingly, when the locking bolt is locked in place, it not only locks the stamping, but also the wheel.

A spare tire cover member may be fastened to the drum so that when the drum is moved into and out of position, the cover member is moved therewith. Means provided on the drum or cover member may be employed to detachably mount thereon a cap which may simulate a hub cap, and which, when mounted, shields the locking mechanism.

Other objects and advantages of the invention will appear as the description proceeds.

This invention, in preferred forms, is illustrated in the drawings and hereinafter more fully described.

Figure 1 is a front elevational view of a wheel and tire cover constructed in accordance with the invention.

Figure 2 is an enlarged fragmentary cross-sectional view showing details of one form of the invention.

Figure 3 is a fragmentary front view of an inner portion of the structure appearing in Figure 2, with the cap entirely removed, and with a portion of the tire cover removed to show the telescoping relation of the wheel and the drum for shielding the wheel supporting means.

Figure 4 is an enlarged fragmentary sectional view showing a modified construction for connecting portions of the cover structure together.

Figure 5 shows a still further modified form of the invention.

Figure 8 is a sectional view similar to Figure 2, but of another form of the invention.

Figure 9 is a sectional view taken substantially as indicated by the line IX—IX in Figure 8.

Figure 6:
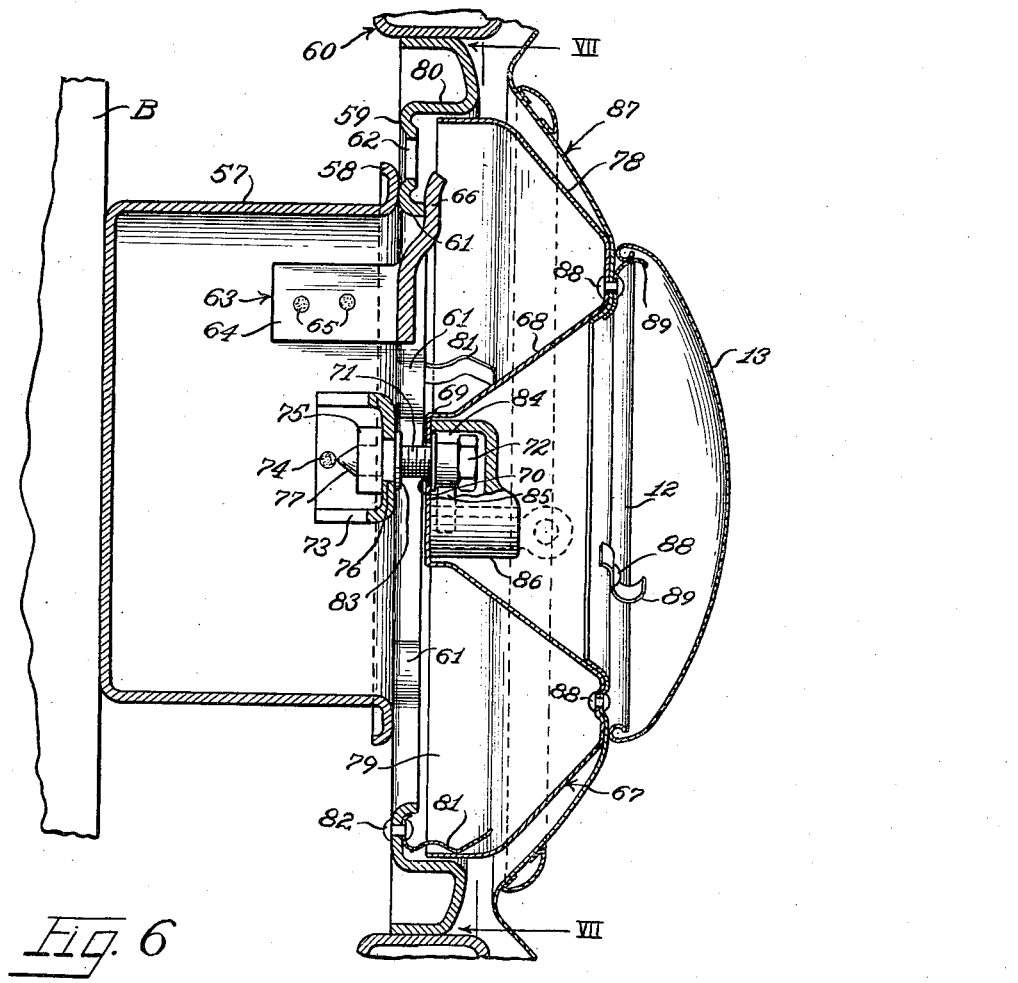
Figure 6 is a view similar to Figure 2, but of a modified form of the invention.

Referring now more particularly to the drawings, it will be noted that, while the shape of the parts may be varied in divers ways, the fronts of the structures may have an appearance substantially as shown in Figure 1, irrespective of the various modifications to be hereinafter more fully explained.

The cover section selected for illustrative purposes herein comprises a side plate 1 and a resilient split ring 2 cushioned therefrom by a rubber or other suitable bead 3, although it is to be understood that the invention is equally applicable to a cover structure which may be formed in a unit to extend over the tread as well as at the front of the tire, or it may be of such a character as to cover substantially only the wheel.

In the form of the invention appearing in Figures 2 and 3, the plate 1 is of annular form and, at its inner peripheral margin 4, is riveted at 5 or otherwise suitably secured to a rearwardly and centrally depressed portion 6 of a drum-like stamping 7. The stamping 7, outwardly of its depressed portion 6, may be tapered rearwardly at 8 and preferably terminates in a generally cylindrical rear margin 9. The drum 7 may be smooth throughout or may be provided with strengthening ribs 7a. Three equally spaced ribs 7a may be employed, or any suitable number other than three. The securing means 5 may also serve to fasten spring elements 11 in position to receive the turned edge portion 12 of a cap 13 which may simulate a hub cap. The inner end 14 of each spring 11 is extended into a hole 15 in the depressed portion 6 of the drum 7 in order to prevent rotation of the spring 11. Three such springs may be found suitable, and of course any number may be employed as desired.

The depressed portions 6 terminates rearwardly in a generally cup-shaped portion 16 having a hole 17 in its bottom for the reception of a locking unit 18. The unit 18 is preferably flanged at 19 in front of the opening 17 to provide space for a spring 20 which serves to urge the unit 18 forwardly and the drum 7 rearwardly. A flange 18a on the unit 18 and disposed rearwardly of and of larger size than the opening 17 serves to prevent separation of the unit 18 from the drum member 7.

The rear end of the unit 18 is formed to fit in an opening 21 in a bar 22 mounted on a wheel carrier 23 which may be suitably permanently fastened to the vehicle chassis or body. The carrier 23 may be of any suitable formation and may include a peripheral wall flanged inwardly at 24 for attachment by bolts 25 or other suitable means to the attaching flange 26 of a wheel 27. The bar 22 may be in the form of a channel member bridging the space within the flange 24 and bent rearwardly at its ends and spot welded as at 28 or otherwise suitably secured to the peripheral wall portions of the carrier 23.

The wheel attaching flange 26 provides the base of a rearwardly depressed hub portion affording a substantially cylindrical peripheral wall 29 in which the corresponding peripheral wall 9 of the drum member 7 is telescopically received as shown in Figure 2. It will be observed that when the parts are telescoped together as shown, the wheel attaching bolt means 25 are completely shielded from the front.

The locking unit 18 is provided with one or more detents 30 controllable by a key inserted as shown in dotted lines at 31 in Figure 2, so as to engage the rear side of the bar 22 adjacent the opening 21, or be released therefrom as desired. When the detents 30 are in locking positions, the front side of the bar 22 is engaged by the collar 18a to thereby fixedly lock the unit 18 to the bar 22. The detents 30 may be manually moved in and out or, if desired, spring means may be employed for moving them out. Either form of construction may be found in conventional locks of this type.

If it is desired to employ only the drum member 7 and associated cap 13, the member 1 may be omitted and the spring elements 11 secured directly to the depressed portion 6. In order to facilitate proper positioning of the drum member 7, the attaching flange 26 of the wheel is preferably provided with forwardly extending springs 31 engageable with the inner side of the member 7 and having free ends 32 engageable in holes 33 in the member 7 to hold the latter from rotation.

When a cover member such as the cover plate 1 is employed in conjunction with the drum member 7, the position of the parts may be determined by the engagement of the plate 1 with the tire A as at 34. The spring 20 thus serves to press the plate 1 against the tire while the remainder of the structure is held substantially free of contact with the wheel. Thus rattling is substantially prevented. For a nominal size, tires may vary to some extent. The spring 20 is thus effective to compensate for tires of different widths and the structure will be operative even though the engagement of the plate 1 with the tire may be forward or rearward of the line 34.

The plate 1 is preferably provided with an opening 35 to allow the tire valve stem 36 to project outwardly therefrom so that the same may be accessible without necessitating removal of the plate 1.

The plate 1 may be provided with suitable ornamentation such as the bead 37 held in place by suitable bolts and nuts 38 as shown.

Figure 4 shows a somewhat modified construction. In this construction, a drum member 39, corresponding with the drum 7 previously described, has a substantially central depression 40 having at its apex a substantially cup-shaped part 41 with an opening 42 at its bottom for co-operation with a locking unit 18 and carrier bar 22 as above described. The drum member 39 is also provided with an outer peripheral substantially cylindrical margin 43 for cooperating with the wheel portion 29 in a manner described above in connection with the portion 9 of the member 7. The drum member 39 may be provided with reinforcing ribs 44 and a circular tapered portion 45 for substantially intimate engagement with a correspondingly tapered portion 46 on the cover member 47.

The bead 37, instead of being connected merely to the cover member as previously disclosed has its fastening means 38 passing through the tapered portions 45 and 46 so as not only to fasten the bead in place but to fasten the cover member 47 to the drum-like member 39. The fastening means 38, of which there is preferably a circumferential series, may be relied upon as the sole connecting means between the members 39 and 47.

Spring elements 48 connected at 49 to an inner depressed part 50 of the cover 47 may be employed to detachably secure the cap 13 in place. The rear end 51 of each spring 48 is bent abruptly into engagement with the depressed portion 50 so as to preclude rotation of the spring element. Three or any other suitable number of spring elements 48 may be provided.

A still further modified construction, somewhat more similar to that appearing in Figure 2 is shown in Figure 5. In this form, the cover member 52 has a rearwardly depressed portion 53 which is welded at 54 or otherwise suitably united with the depressed portion 6 of the drum member 7, and the spring elements 11 are secured as at 55 to the depressed portion 53, rotation of the elements 11 being precluded by the insertion of the ends 14 through openings 56 in said depressed portion 53.

Figure 7:
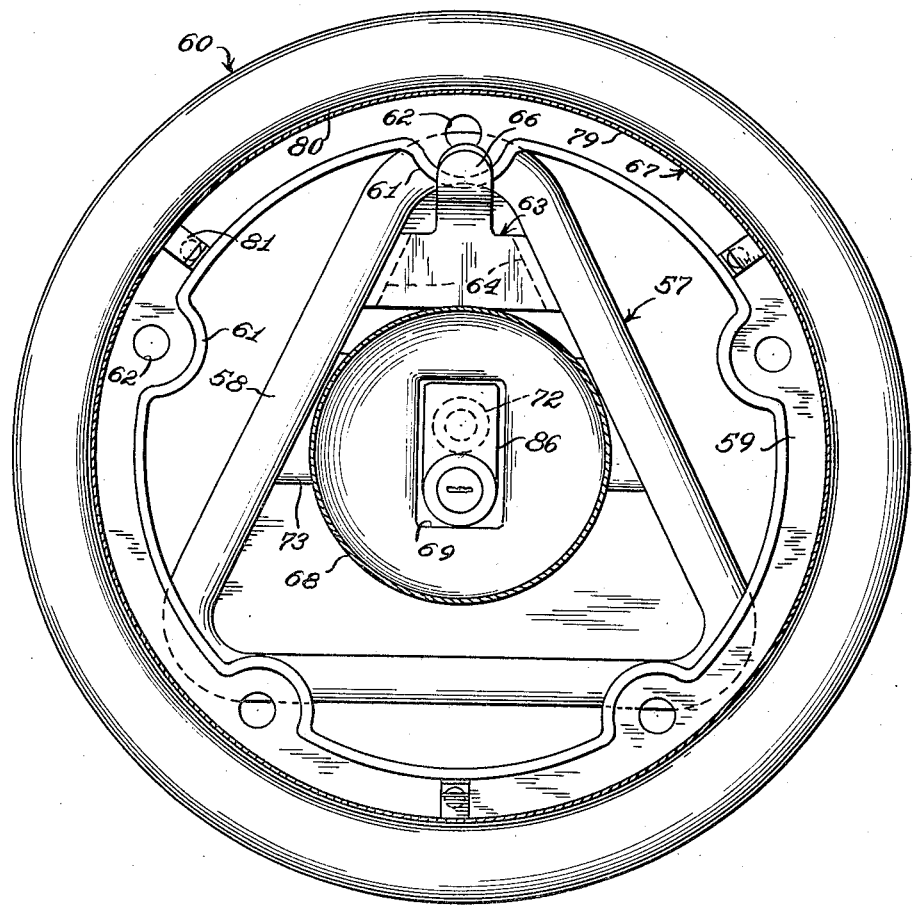
Figure 7 is a front sectional view taken substantially as indicated by the line VII—VII in Figure 6.

Another modified form of the invention is shown in Figures 6 and 7. A portion of the vehicle body or chassis is shown fragmentarily at B and to it a generally cup-shaped carrier 57 is secured preferably permanently by any suitable means (not shown). The carrier may be triangular as shown in Figure 7 or of any other suitable outline, and is preferably provided with an outwardly extending flange 58 for abutment with the rear side of the attaching flange 59 of the wheel 60. The flange 59 is formed with a suitable number of inwardly extending ears 61 of sufficient size to permit of the provision of bolt holes 62 whereby the wheel may be bolted at the axle in a position to support the vehicle. Any suitable number of ears may be provided.

A retaining element 63 is provided to cooperate with the carrier 57 in detachably supporting the wheel. The element 63 is substantially T-shaped, its head 64 being bent into the form of a U with its sides extending rearwardly and spot welded at 65 to the wall of the carrier 57, and with its stem 66 extending upwardly in front of and in spaced relation to the carrier flange 58. The inner part of each ear 61 is extended transversely and is adapted to fit between the flange 58 and the stem 66 without wedging. The front outer margin of the flange 58 and the adjacent end of the stem 66 diverge to facilitate the guiding of the ear 61 into the space between them.

The drum, tire cover and associated structure may be of any suitable character, those chosen for illustrative purposes in connection with Figures 6 and 7 resembling more nearly that form appearing in Figure 2. The drum-like member 67 is accordingly formed with a radially inner rearwardly depressed portion 68 of round or any other desired form, terminating rearwardly in a non-circular cup-like part 69 having in its bottom a hole 70 through which the threaded shank 71 of a securing bolt 72 may extend.

The carrier 57 is provided with a bar 73 arranged to extend between opposed portions of the carrier and to be bent rearwardly and spot-welded at 74 or otherwise suitably secured to the carrier. A nut 75 is disposed at the rear side of the bar 73 substantially in the middle thereof and has a hollow stem passing forwardly through a hole 76 in the bar and is spun out into a flange 83 in a manner to lock the nut against rotation in the hole. The free end of the shank 71 may be tapered as at 77 to facilitate positioning of the shank in the various openings.

The drum-like member 67 is outwardly tapered rearwardly at 78 and terminates in a rearwardly extending substantially cylindrical margin 79 which is telescopically receivable by the similarly formed hub wall 80 of the wheel 60. The substantially cylindrical margin 79 is easily guided and held against rattling in the wall 80 by a plurality of springs 81 engaging the margin 79 and secured at 82 to the attaching flange 59 of the wheel.

The bolt 72 may be locked against theft and, to this end, is provided below the head thereof with a peripheral groove 84 adapted to receive a locking detent 85 carried by a lock housing 86 which may be of the snap-on type if desired. This housing is of preferably the same general non-circular outline as the part 69 of the drum-like member 67 so that the housing cannot be rotated therein. The detent 74 may be key-operated and, when the detent is in retracted position, the housing may be readily applied to and removed from the bolt 72.

The bolt 72 is arranged eccentrically to the peripheral wall 79 of the drum-like member 67 and therefore to the associated wall 80 of the wheel 60. Consequently, it is clear that the drum-like member 67 cannot be rotated appreciably with respect to the wheel 60. Hence unauthorized retraction of the bolt 72 is prevented.

The cover member 87 is preferably open centrally and is arranged to project into the depression 68 and to engage the drum-like member 67 intermediate its depressed portion 68 and outwardly tapered portion 78. At suitable places along the area of engagement, the cover member 87 is riveted as shown at 88 or otherwise suitably secured in place. At certain of such points, cap retaining springs 89 are also secured in place.

The bolt 72 and housing 86 serve not only to lock the drum-like member 67 and cover member 87 in place but also to lock the spare wheel and tire against theft.

Somewhat similar to the form shown in Figure 2 is that appearing in Figures 8 and 9. In this modified construction, the hood 90 has a generally central funnel portion 91 having at its apex 92 a central opening 93 for the lock unit 18. A spring 94 urges the unit 18 forward and thus urges the hood 90 rearwardly and holds the attached tire cover 95 against tires of different widths.

The cover 95 is shown with its outer part removed and may be attached to the hood at the front 96 of the funnel portion 91 as by rivets 97.

To prevent an unauthorized person from gaining access to and cutting off the heads of the rivets and stealing the wheel and tire, a protective or guard plate 98 is provided. This plate, which is preferably of a form similar to the central portion 91 of the drum-like member or hood 90, is inwardly turned at its apex 99 for engagement with the apex 92 of the hood and centrally open at 100 to allow the lock unit 18 to pass therethrough. The spring 94 is disposed between the apex 99 of the guard plate 98 and the lock unit flange 19. This unit allows the plate to swivel but locks it to the hood 90.

The front part of the guard 98 is flanged outwardly at 101 in a position where it overlies the rivets 97 and, at its edge 102 outwardly beyond the rivets, is turned rearwardly into close proximity to the riveted part of the tire cover 95, so as to provide a protective overhanging rim preventing insertion at the rear thereof of a rivet mutilating tool. The amount of movement allowed by the spring 94 is merely sufficient to compensate for variations in width of tires of the same nominal size, and is insufficient to permit entry of such a tool between the guard rim 102 and the tire cover 95. Moreover, the guard plate 98 is case-hardened to prevent cutting thereof. Thus the plate 98 effectively prevents unauthorized access to the rivets.

Instead of employing a removable snap-on cap such as the cap 13, a hinged cap may be employed. To this end, a hinge bracket 103 is disposed in the space 104 between the hood 90 and tire cover 95 adjacent the place of connection thereof and secured as by rivet means 105, welding or the like to the hood. The bracket 103 affords spaced perforated ears 106 between and to which the eye 107 of a second hinge bracket 108 is hinged at 107a. The bracket 108 extends inwardly through an opening 109 in the adjacent rearwardly depressed portion 110 of the cover 95 and is angular so as to project frontward at 111 from said opening when the cap is in closed position.

The cap 112 may be of laminated form comprising a reinforcing inner part 113 and an ornamental outer sheath 114 and has its margin turned rearwardly and inwardly at 115 to engage the cover at 116 outwardly of the depression 110 and provide a free retaining edge 117. The inner part 113 has a struck offset portion 118 constituting an attaching bracket to which the channeled front part 119 of the hinge bracket 108 is fastened at 120. Opposite the hinge structure, a latch spring 121 is fastened, preferably by one of the rivets 97. This spring is formed to snap over the edge 117 of the cap 112, to releasably hold the cap in closed position against rattling. There is sufficient space at the rim 115 to apply a finger nail or a tool to enable a person to pry the cap off the spring 121 to open position.

It will be seen that when the cap is open it may move to a substantially horizontal position, the shallow funnel form of the guard 98 rendering the lock unit 18 readily accessible by hand and key. If desired, the cap may be releasably latched or otherwise suitably held in horizontal or other open position.

It will be seen from the foregoing that the invention is extremely simple since it involves a minimum of parts which are of a character easily stamped or otherwise formed at low cost, the construction being adapted for use with conventional or any other suitable lock mechanisms. The drum-like member may be employed in the absence of a tire cover member, and under such circumstances, if desired, the cap retaining clips may be secured directly to the drum-like member independently of any other cover member.

The wheel walls 29 and 80, although described as cylindrical, may of course be of any other suitable shape so long as they perform their proper functions from the standpoint of wheel structure per se and from the standpoint of telescopically cooperating with the hood.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a wheel assembly, a wheel, a wheel support, said wheel and support having cooperating attaching means adjacent the rim of the wheel, means cooperating with said attaching means and mounting said wheel on said support, a hood disposed over the front of the wheel and shielding said attaching and mounting means, means carried by said hood and engageable with the front of a tire mounted on the wheel, and means adjustably supporting said hood from said wheel support so that said hood may be held in cooperative relation with said wheel notwithstanding variations in width of tires carried by the wheel.

2. In a wheel assembly, a wheel, a wheel support, said wheel and support having cooperating attaching means adjacent the rim of the wheel, means cooperating with said attaching means and mounting said wheel on said support, a hood disposed over the front of the wheel and shielding said attaching and mounting means, means carried by said hood and engageable with the front of a tire mounted on the wheel, means adjustably supporting said hood from said wheel support so that said hood may be held in cooperative relation with said wheel notwithstanding variations in width of tires carried by the wheel, and means for locking said hood supporting means and thereby also locking said wheel to said support.

3. In a wheel assembly, a wheel, a wheel support, said wheel and support having cooperating attaching means adjacent the rim of the wheel, means cooperating with said attaching means and mounting said wheel on said support, a hood disposed over the front of the wheel and shielding said attaching and mounting means, means carried by said hood and engageable with the front of a tire mounted on the wheel, and means adjustably supporting said hood from said wheel support so that said hood may be held in cooperative relation with said wheel notwithstanding variations in width of tires carried by the wheel, said adjustable means comprising a spring operative to press the engaging means against the tire.

4. In a wheel assembly, a wheel having a substantially cylindrical wall, a wheel support, means mounting said wheel on said support, a circular hood having its outer peripheral part telescoped with said wall, means cooperating with substantial portions of said support and hood and mounting said hood in position, a tire cover member mounted on said hood and shaped to shield a tire carried bp the wheel, a cap for shielding the hood mounting means, and means carried by the cover member for detachably supporting said cap.

5. In a wheel assembly, a wheel having a substantially cylindrical wall, a wheel support, means mounting said wheel on said support, a circular hood having its outer peripheral part telescoped with said wall, means cooperating with substantial portions of said support and hood and mounting said hood in position, a tire cover member mounted on said hood, and a circular bead mounted on said member by the means mounting said member on said hood.

6. In a wheel assembly, a wheel, a wheel support, means mounting said wheel on said support, a hood for said means and having its outer peripheral part guided by and telescoped with said wheel, means cooperating with substantially central portions of said support and hood and mounting said hood in position, a tire cover member mounted on said hood and shaped to shield a tire carried by the wheel, a cap for shielding the hood mounting means, and means carried by the cover member for detachably supporting said cap.

7. In a wheel assembly, a wheel, a wheel support, means mounting said wheel on said support, a hood for said means and having its outer peripheral part guided by and telescoped with said wheel, means cooperating with substantially central portions of said support and hood and mounting said hood in position, an ornamental member disposed over the outer side of said hood and wheel, means for mounting and securing said member to said hood, and a circular bead mounted on said member by the means mounting said member on said hood.

8. In combination with a wheel support, an anti-theft structure for a wheel detachably mounted on the support, said structure comprising a hood, a theft proof lock formed to releasably lock the hood to the support, said hood being shaped to shield the means mounting the wheel on the support, an annular tire cover mounted on the hood, and hardened guard means locked by said lock and shaped so as to shield the means mounting the cover on the hood, whereby the wheel, tire, hood and cover are locked against unauthorized removal.

9. In combination with a wheel support, an annular tire cover member, a central supporting member for said tire cover member adapted to engage said wheel support, means integrally uniting the inner periphery of the cover member to the supporting member, hardened guard means shielding said uniting means against unauthorized access, and releasable theft proof locking means locking said central supporting member to the wheel support in a position to hold the cover member in proper tire protecting position.

10. In combination with a wheel support, an annular tire cover member, a central supporting member for said tire cover member adapted to engage said wheel support, means integrally uniting the inner periphery of the cover member to the supporting member, hardened guard means shielding said uniting means against unauthorized access, and theft proof means locking said central supporting member to the wheel support in a position to hold the cover member in proper tire protecting position, said guard means comprising a plate extending from said lock outwardly beyond said uniting means.

11. In combination with an automobile wheel support, an inner supporting member having a substantially central opening for means to fasten the member to the support, an annular tire cover secured to said member, means for preventing unauthorized access to the securing means, a hinge bracket secured between the member and cover and shielded from the front by the cover, a cap hinged to said bracket and shaped to swing to open and close said opening, and readily releasable latch means for holding the cap in closed position.

12. In a combination lock and spare wheel cover structure including a wheel centrally secured to a support and a spare tire on the wheel, and a metallic tire cover, a separate central disk for clamping the cover in position over the tire, means for locking the disk to said support, said means being accessible through a central aperture in said disk, and a closure cap carried by said disk over said aperture for concealing said locking means.

13. In a combination lock and spare wheel cover structure including a spare tire and wheel centrally secured to a support, and a metallic tire cover, a removable central disk for clamping the cover in position over the tire, means for locking the disk to said support accessible through a central aperture in said disk, and a closure cap carried by said disk over said aperture for concealing said locking means, said disk being of such size as to conceal and render inaccessible the wheel securing means when the disk is locked to the support and having an outer peripheral portion in clamping engagement with a side portion of the tire cover to lock the cover against removal from the tire.

14. In a combination lock and spare wheel cover structure including a spare tire and wheel centrally secured to a support, and a metallic tire cover, a central disk for clamping the cover in position over the tire, means for locking the disk to said support accessible through a central aperture in said disk, and a closure cap carried by said disk over said aperture for concealing said locking means, said disk having a portion extending transversely inwardly of the wheel to which said locking means is connected directly to the rear of said central aperture and said disk also having connected to it spring means positioned to enable the closure cap to be snapped into retained engagement therewith.

BLADEN M. SHORT.